US009756156B2

(12) United States Patent
Wang

(10) Patent No.: US 9,756,156 B2
(45) Date of Patent: Sep. 5, 2017

(54) TERMINAL

(71) Applicant: ZTE CORPORATION, Shenzhen, Guangdong Province (CN)

(72) Inventor: Yanbin Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/320,747

(22) PCT Filed: Aug. 20, 2014

(86) PCT No.: PCT/CN2014/084809
§ 371 (c)(1),
(2) Date: Dec. 20, 2016

(87) PCT Pub. No.: WO2015/196546
PCT Pub. Date: Dec. 30, 2015

(65) Prior Publication Data
US 2017/0126859 A1    May 4, 2017

(30) Foreign Application Priority Data

Jun. 23, 2014    (CN) .................... 2014 2 0337736 U

(51) Int. Cl.
*H04M 1/00* (2006.01)
*H04B 1/38* (2015.01)
*H04M 1/02* (2006.01)

(52) U.S. Cl.
CPC ......... *H04M 1/026* (2013.01); *H04M 1/0268* (2013.01)

(58) Field of Classification Search
CPC ... H04M 1/026; H04M 1/0216; H04M 1/0268
(Continued)

(56) References Cited

U.S. PATENT DOCUMENTS 7,688,397 B2 *  3/2010  Serizawa ............ B60R 11/0235
                                          349/56
9,071,673 B2 *  6/2015  Choi ................... H04M 1/0216
(Continued)

FOREIGN PATENT DOCUMENTS

| CN | 102984893 A | 3/2013 |
| CN | 103827771 A | 5/2014 |
| CN | 203632709 U | 6/2014 |

*Primary Examiner* — Quochien B Vuong
(74) *Attorney, Agent, or Firm* — Ling Wu; Stephen Yang; Ling and Yang Intellectual Property

(57) ABSTRACT

The disclosure provides a terminal, including a flexible terminal body, a rigid bracket, a pull rod, and a terminal battery and main board adapted to a structure of the rigid bracket. The rigid bracket is fixed on the flexible terminal body, the rigid bracket includes a plurality of sub-brackets and rotating shafts, and the plurality of sub-brackets are lined up along the flexible terminal body; the terminal battery is arranged in cavities formed by two adjacent sub-brackets, and is penetrated by two rotating shafts on two sub-brackets respectively; the main board is arranged on an outer side of the rigid bracket; the plurality of sub-brackets and the terminal battery rotate around the corresponding rotating shafts; and two extending heads at tail ends of the pull rod are inserted into positioning holes of the corresponding sub-brackets for positioning after the flexible terminal body is curved to a preset curving position.

7 Claims, 2 Drawing Sheets

(58) Field of Classification Search
USPC .......... 455/90.3, 550.1, 575.1; 379/433.01, 379/433.11, 434
See application file for complete search history.

(56) References Cited

U.S. PATENT DOCUMENTS 9,512,864 B2* 12/2016 Gamboa .............. B23Q 9/0042
2012/0264489 A1 10/2012 Choi et al.

* cited by examiner

TERMINAL

TECHNICAL FIELD

The disclosure relates to the field of mobile communication, and more particularly to a terminal.

BACKGROUND

In the era of functional mobile phones, terminal bodies are rigid, and have more structural forms, including: a bar form, a clamshell form, a slide form, a cap screwing form and the like. At present, communication terminals are developed towards intelligence, and screens of terminals are increasingly enlarged, which determines that the bar form is adopted for most of terminals. Along with development of a technology, a display screen technology also changes quickly, and curved flexible screens appear on the market. There are also some terminals with a curving function, but these terminals may not be restored into a flattened state once being curved.

SUMMARY

In view of the problem that a terminal may not be switched between curved and flattened states in a related technology, the disclosure provides a terminal, so as to solve the problem or at least partially solve the problem.

The embodiment of the disclosure provides a terminal, which may include: a flexible terminal body, a rigid bracket, a pull rod, and a terminal battery and main board adapted to a structure of the rigid bracket, herein the rigid bracket may be fixed on the flexible terminal body, the rigid bracket may include a plurality of sub-brackets and a plurality of rotating shafts, the plurality of sub-brackets may be lined up along the flexible terminal body, the terminal battery may be arranged in cavities formed by every two adjacent sub-brackets, and may be penetrated by the two rotating shafts on the corresponding two sub-brackets respectively, the main board may be arranged on an outer side of the rigid bracket, the plurality of sub-brackets and the terminal battery may be arranged to rotate around the corresponding rotating shafts when the flexible terminal body is curved, and the pull rod may be arranged to position the flexible terminal body by inserting two extending heads at its tail ends into positioning holes of the corresponding sub-brackets after the flexible terminal body is curved to a preset curving position.

Alternatively, the pull rod may also be arranged to restore the terminal from a curved state to a flattened state by extracting the two extending heads at its tail ends from the positioning holes.

Alternatively, the terminal battery may include a plurality of sub-batteries, and the plurality of sub-batteries may be arranged in the cavities formed by every two adjacent sub-brackets respectively.

Alternatively, the main board may include a plurality of sub main boards connected by a flexible material, and flexible material joints between the plurality of sub main boards may be arranged at positions of curved parts of the rigid bracket.

Alternatively, the sub-bracket positioned in middle in the plurality of sub-brackets of the rigid bracket may be a transverse H-shaped structure, and the sub-brackets on two sides may be opposite concave structures.

Alternatively, the pull rod may be provided with a button, and the button may be arranged to control the pull rod to insert or extract the two extending heads at its tail ends into or from the positioning holes under the action of a spring.

Alternatively, the preset position may be a limiting position where curving between the two adjacent sub-brackets is stopped by rigid contact during curving.

The embodiment of the disclosure has the following beneficial effects.

The embodiment of the disclosure is adapted to a characteristic of a curved flexible screen, the curved and flattened states may be mutually switched on the basis of the rigid bracket with a hinge structure, and the characteristic that the flexible screen may be curved and restored to be flat may be fully developed. In addition, the whole structure manufacturing process of the embodiment of the disclosure is mature and low in cost, and function realization completely depends on the mature hinge mechanism, so that using experiences of a user are improved, and a using space of the flexible screen is also greatly enlarged.

BRIEF DESCRIPTION OF DRAWINGS

The drawings are only adopted to show a purpose of a preferred implementation mode and not considered as a limit to the disclosure. Moreover, in the whole drawings, the same reference symbols are adopted to represent the same parts. In the drawings.

Figure 1:
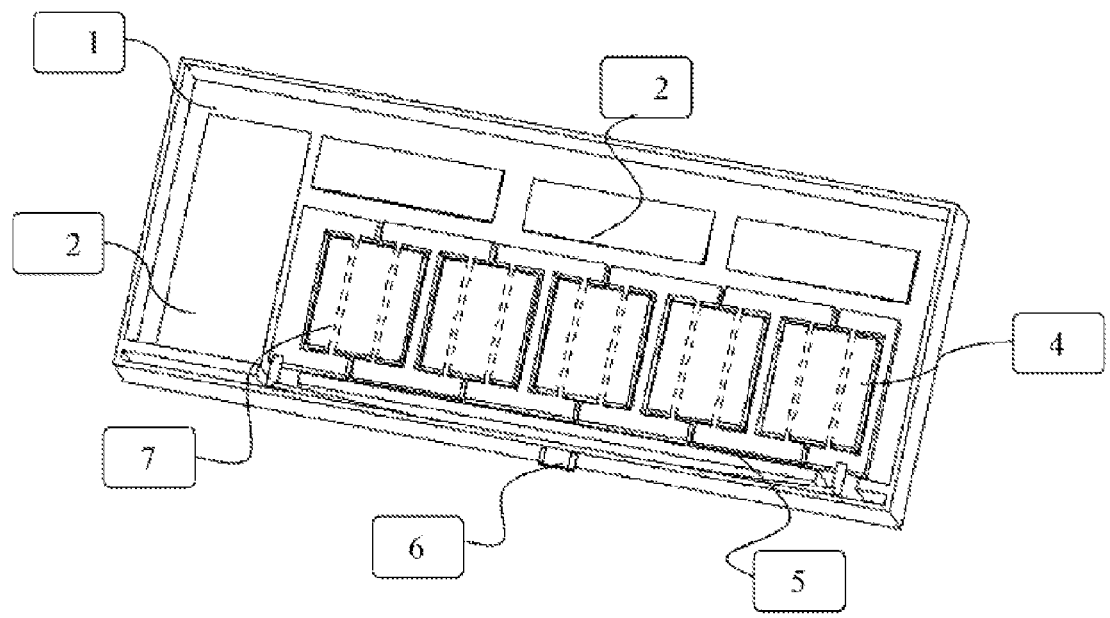
FIG. 1 is a schematic diagram of a terminal according to an embodiment of the disclosure.

In the drawings, 1 is flexible terminal body, 5 is rigid bracket, 6 is pull rod, 4 is terminal battery and 2 is main board.

SPECIFIC EMBODIMENTS

Exemplary embodiments of the disclosure will be described below with reference to the drawings in detail. Although the exemplary embodiments of the disclosure are shown in the drawings, it should be understood that the disclosure may be implement in various forms without limitation of the embodiments elaborated here. Instead, these embodiments are provided to make the disclosure understood more thoroughly and completely deliver the scope of the disclosure to those skilled in the art.

In order to solve the problem that a terminal may not be switched between curved and flattened states in the related technology, the embodiment of the disclosure provides a terminal, hinge mechanisms of rigid brackets are adopted for connection, and in a curving process of an equipment body, the rigid brackets and batteries may rotate a certain angle around shafts, a maximum curving position is reached when two adjacent brackets rotate to contact with an edge of the battery therebetween, and at this moment, a pull rod is pressed to enable two extending ends of the pull rod into holes of the two tail-end rigid brackets to lock the rigid brackets, so that the rigid brackets and the battery are fixed, and a curved posture is maintained.

The disclosure will be further described below with reference to the drawings and embodiments in detail. It should be understood that the specific embodiments described here are only adopted to explain the disclosure and not intended to limit the disclosure.

According to the embodiment of the disclosure, a terminal is provided. FIG. 1 is a schematic diagram of a terminal according to an embodiment of the disclosure, and as shown in FIG. 1, the terminal includes: a flexible terminal body 1, a rigid bracket 5, a pull rod 6, and a terminal battery 4 and main board 2 adapted to a structure of the rigid bracket; and each part of the terminal of the embodiment of the disclosure will be described in detail.

As shown in FIG. 1, the rigid bracket 5 is fixed on the flexible terminal body 1, the rigid bracket 5 includes a plurality of rotating shafts 7 and sub-brackets, the plurality of sub-brackets are lined up along the flexible terminal body 1, the terminal battery 4 is arranged in a cavity formed by two adjacent sub-brackets and is penetrated by two rotating shafts 7 on the two sub-brackets respectively, the main board 2 is arranged on an outer side of the rigid bracket 5, and when the flexible terminal body 1 is curved, the plurality of sub-brackets and the terminal battery 4 rotate around the corresponding rotating shafts 7, and two extending heads at tail ends of the pull rod 6 are inserted into positioning holes of the corresponding sub-brackets for positioning after the flexible terminal body is curved to a preset curving position.

Herein, after the two extending heads at the tail ends of the pull rod 6 are extracted from the positioning holes, the terminal is restored from a curved state to a flattened state.

The terminal battery 4 includes a plurality of sub-batteries, and the plurality of sub-batteries are arranged in the cavities formed by every two adjacent sub-brackets respectively. The main board 2 includes a plurality of sub main boards, the plurality of sub main boards are connected by the flexible material, and flexible material joints between the plurality of sub main boards are arranged at positions adapted to curved parts of the rigid bracket 5.

Alternatively, the sub-bracket positioned in middle in the plurality of sub-brackets of the rigid bracket 5 is a transverse H-shaped structure, and the sub-brackets on two sides are opposite concave structures.

The pull rod 6 is provided with a button, and the button is used to control the pull rod to insert or extract the two extending heads at tail ends into or from the positioning holes under the action of a spring.

Alternatively, the preset position is a limiting position where curving between the two adjacent sub-brackets is stopped by rigid contact during curving. At the limiting position, two extending heads at the tail ends of the pull rod 6 are inserted into the positioning holes of two tail-end sub-brackets of the rigid bracket 5, and if positioning is required to be performed at another curving angle, the two extending heads at the tail ends of the pull rod 6 may be inserted into the positioning holes of the corresponding sub-brackets to implement positioning at any curving angle.

The technical solution of the embodiment of the disclosure will be described below with reference to the drawings in detail.

As shown in FIG. 1, the flexible terminal body 1 is a substrate of terminal equipment, and it adopts a flexible material design; and a Printed Circuit Board (PCB) 2 (corresponding to the main board) and a plurality of PCBs 3 with small sizes are connected by virtue of a Flexible Printed Circuit (FPC) to ensure a sufficient curving space without interference.

Figure 2:
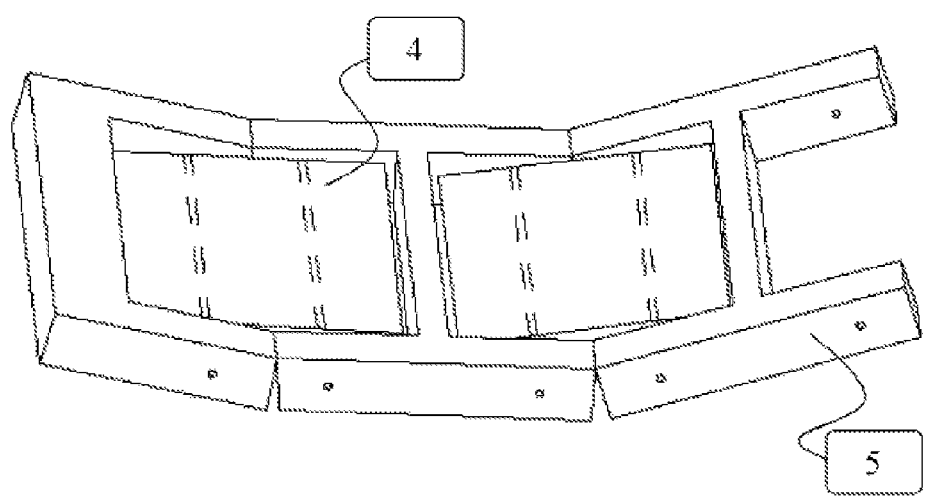
FIG. 2 is a schematic diagram of a position posture of a rigid bracket and a terminal battery after curving according to an embodiment of the disclosure.
Figure 3:
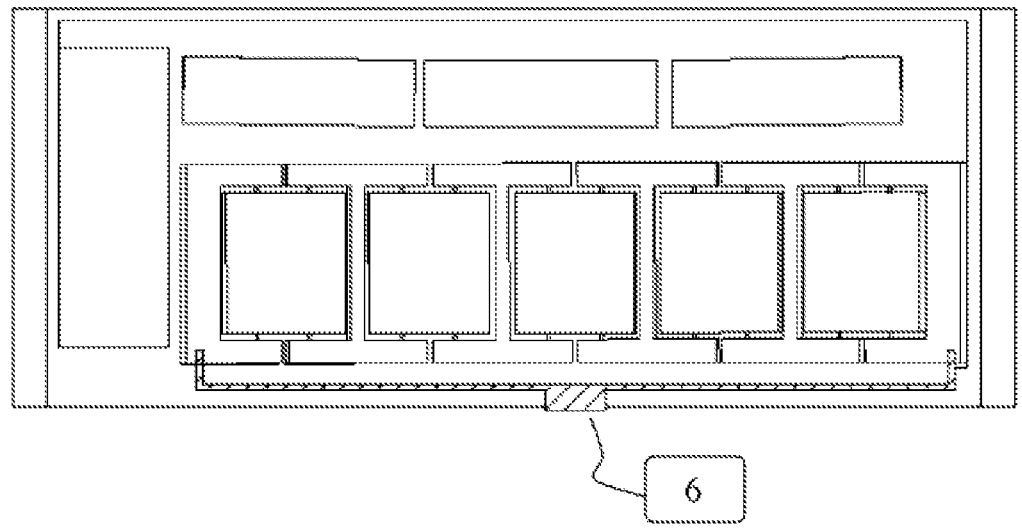
FIG. 3 is a schematic diagram of locking a rigid bracket by a pull rod after curving according to an embodiment of the disclosure.
Figure 4:
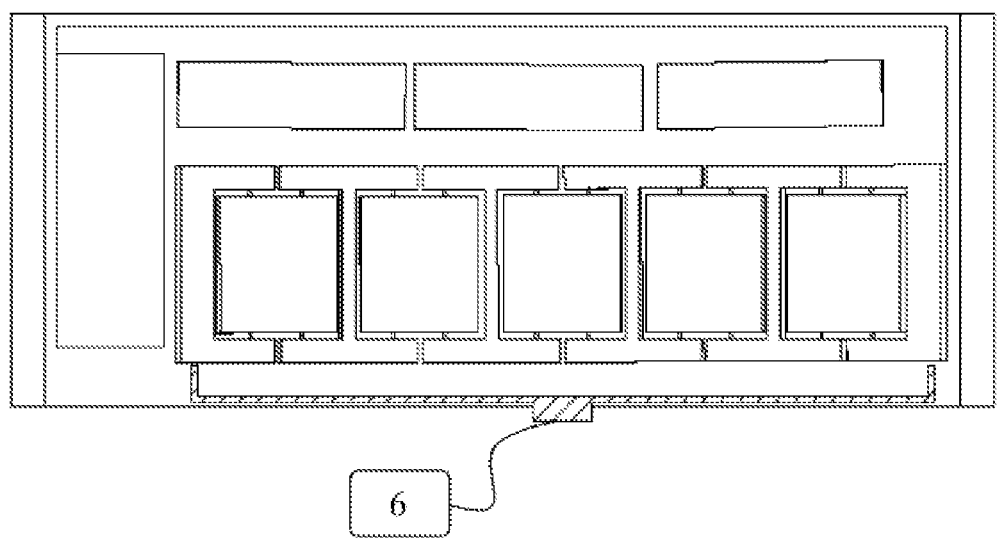
FIG. 4 is a schematic diagram of releasing a locked rigid bracket by a pull rod according to an embodiment of the disclosure.

The rigid bracket 5 is fixed on the flexible terminal body 1. As shown in FIG. 2, during initial curving, positions of the rigid bracket 5 and the terminal battery 4 change by a certain angle around the rotating shafts 7, and when the curving angle is continuously enlarged, the positions of the rigid bracket 5 and the terminal battery 4 may change more until a curving operation is stopped by a rigid contact of the rigid bracket 5 after an edge of the rigid bracket 5 contacts with an edge of the terminal battery 4, at this moment, the limiting curving position is reached. Then the button of the pull rod 6 is pressed down, and as shown in FIG. 3, two extending heads at the tail ends of the pull rod 6 are inserted into the holes of the rigid bracket 5 under the action of the spring to lock the whole rigid bracket 5 and the terminal battery 4 by virtue of the rigid pull rod to form a whole of which the position may not change and keep it in the curved state. As shown in FIG. 4, when it is necessary to release the curved state, the button of the pull rod 6 is pressed down again, the pull rod is rebounded, the extending heads of the pull rod withdraw from the holes of the rigid bracket 5, and at this moment, the rigid bracket 5 and the terminal battery 4 may be kept in the flattened state with enough degrees of freedom.

The embodiment of the disclosure may be applied to a terminal with a flexible screen, and the characteristic that the flexible screen may be curved and restored to be flat may be fully developed. For example, after a product such as a smart phone adopts a flexible screen, the phone may be curved to be more attached to the face of a user when it is necessary to make or answer a call, so that comfort is improved. When it is necessary to operate the screen, the curved state may be released for operation in the flat state, which is the same as an operating condition of an ordinary smart phone.

The embodiment of the disclosure keeps in step with development of a display screen technology, and well develops the characteristic of the flexible screen, and the whole structure manufacturing process is mature and low in cost, and function realization completely depends on the mature hinge mechanism, which is very novel for the user and greatly enlarges a using space of the flexible screen.

Obviously, those skilled in the art may make various modifications and transformations to the embodiment of the disclosure without departing from the spirit and scope of the disclosure. Therefore, if these modifications and transformations of the embodiment of the disclosure belong to the scope of the claims of the disclosure and an equivalent technology, the disclosure is intended to include these modifications and transformations.

INDUSTRIAL APPLICABILITY

The technical solution is adapted to the characteristic of the curved flexible screen, the curved and flattened states may be mutually switched on the basis of the rigid bracket with the hinge structure, and the characteristic that the flexible screen may be curved and restored to be flat may be fully developed. In addition, the whole structure manufacturing process of the technical solution is mature and low in cost, and function realization completely depends on the mature hinge mechanism, so that the using experiences of the user are improved, and the using space of the flexible screen is also greatly enlarged.

I claim:

1. A terminal, comprising: a flexible terminal body (1), a rigid bracket (5), a pull rod (6), and a terminal battery (4) and main board (2) adapted to a structure of the rigid bracket (5), wherein the rigid bracket (5) is fixed on the flexible terminal body (1), the rigid bracket (5) comprises a plurality of sub-brackets and a plurality of rotating shafts, and the plurality of sub-brackets are lined up along the flexible terminal body (1);

the terminal battery (4) is arranged in a cavity formed by two adjacent sub-brackets, and is penetrated by two rotating shafts on the two sub-brackets respectively;

the main board (2) is arranged on an outer side of the rigid bracket (5);

the plurality of sub-brackets and the terminal battery (4) are arranged to rotate around corresponding rotating shafts when the flexible terminal body (1) is curved; and the pull rod (6) is arranged to position the flexible terminal body (1) by inserting two extending heads at tail ends of the pull rod into positioning holes of corresponding sub-brackets after the flexible terminal body (1) is curved to a preset curving position.

2. The terminal according to claim 1, wherein the pull rod (6) is also arranged to restore the terminal from a curved state to a flattened state by extracting the two extending heads at tail ends of the pull rod from the positioning holes.

3. The terminal according to claim 1, wherein the terminal battery (4) comprises a plurality of sub-batteries and the plurality of sub-batteries are respectively arranged in cavities formed by every two adjacent sub-brackets.

4. The terminal according to claim 1, wherein the main board (2) comprises a plurality of sub main boards connected by flexible material, and flexible material joints between the plurality of sub main boards are arranged at positions of curved parts of the rigid bracket (5).

5. The terminal according to claim 1, wherein the sub-bracket positioned in middle in the plurality of sub-brackets of the rigid bracket (5) is a transverse H-shaped structure, and the sub-brackets on two sides are opposite concave structures.

6. The terminal according to claim 1, wherein the pull rod (6) is provided with a button, and the button is arranged to control the pull rod (6) to insert or extract the two extending heads at tail ends into or from the positioning holes under the action of a spring.

7. The terminal according to claim 1, wherein the preset position is a limiting position where curving between the two adjacent sub-brackets is stopped by rigid contact during curving.

* * * * *